United States Patent
Nagata et al.

(10) Patent No.: US 7,295,394 B2
(45) Date of Patent: Nov. 13, 2007

(54) REPRODUCING METHOD, REPRODUCING APPARATUS, RECORDING AND REPRODUCING APPARATUS, AND MAGNETIC RECORDING MEDIUM

(75) Inventors: Takeshi Nagata, Kanagawa (JP); Naoto Abe, Kanagawa (JP); Hisashi Osawa, Ehime (JP); Yoshihiro Okamoto, Ehime (JP)

(73) Assignee: Fujifilm Corporation, Tokyo (JP)

( * ) Notice: Subject to any disclaimer, the term of this patent is extended or adjusted under 35 U.S.C. 154(b) by 225 days.

(21) Appl. No.: 11/146,025

(22) Filed: Jun. 7, 2005

(65) Prior Publication Data

US 2005/0225888 A1    Oct. 13, 2005

(51) Int. Cl.
*G11B 5/035* (2006.01)
*G11B 5/09* (2006.01)

(52) U.S. Cl. .......................................... 360/65; 360/46

(58) Field of Classification Search .................... None
See application file for complete search history.

(56) References Cited

U.S. PATENT DOCUMENTS 5,347,408 A * 9/1994 Gohda et al. ................. 360/65
6,249,398 B1 * 6/2001 Fisher et al. .................. 360/65

FOREIGN PATENT DOCUMENTS

JP    2002-157827 A    5/2002

\* cited by examiner

*Primary Examiner*—Andrea Wellington
*Assistant Examiner*—Dan I Davidson
(74) *Attorney, Agent, or Firm*—Sughrue Mion, PLLC

(57) ABSTRACT

Provided are a method and apparatus for equalizing and demodulating an information signal recorded in a magnetic recording medium by a partial response signal processing system if an isolated reversion producing waveform reproduced from the magnetic recording medium indicates an asymmetry. The method and apparatus reproduce the information signal from a high recording density of the magnetic recording medium.

22 Claims, 2 Drawing Sheets

REPRODUCING METHOD, REPRODUCING APPARATUS, RECORDING AND REPRODUCING APPARATUS, AND MAGNETIC RECORDING MEDIUM

BACKGROUND OF THE INVENTION

1. Field of the Invention

The present invention relates to a reproducing method, a reproducing apparatus, a recording and reproducing apparatus, and a magnetic recording medium, and particularly, to the reproducing method, the reproducing apparatus, the recording and reproducing apparatus, and the magnetic recording medium adequate for a high recording density of the magnetic recording medium.

2. Description of the Related Art

These years an improvement of a recording density in a magnetic recording medium such as a magnetic recording tape and a magnetic disk is remarkable. Therefore, corresponding to a high recording density of a recording medium, various technologies are suggested regarding a recording and reproducing apparatus and are in practical use. For example, various technologies are suggested for an adoption of an MR (Magneto Resistive) head as a recording/reproducing head, an improvement of an interface with the recording medium and the heads, and the like, and are in practical use.

Furthermore, also in a sphere of a signal processing technology, in order to recover a deterioration of an S/N ratio accompanied with the high recording density, a PRML system combining a PR (partial response) system and an ML (Maximum Likelihood) system is in practical use in a recording and reproducing apparatus for using a recording medium such as a magnetic disk, a digital VTR, a magnetic tape for a computer backup, and an optical disk.

As such the recording and reproducing apparatus, for example, there exists one disclosed in JP 2002-157827A. Meanwhile, U.S. Pat. No. 6,337,889 corresponding to JP 2002-157827A is hereby incorporated by reference hereinafter in its entirety.

In the PRML signal processing system are known various systems such as a PR4ML (PR (1, 0, −1)ML), EPR4ML (PR (1, 1, −1, −1)ML), EEPR4ML (PR (1, 2, 0, −2, −1)ML), EEEPR4ML (PR (1, 3, 2, −2, −2, −3, −1)ML), according to a number of terms of a signal sequence where an equalizing processing is performed.

Then according to a characteristic of a magnetic material used, if an optimum partial response signal processing is applied, it is effective because an information signal recorded in a magnetic recording medium with a high density can be restored with a low error rate. For example, a magnetic recording medium having a magnetic layer containing hexagonal ferrite as a magnetic material has a characteristic that a reproducing output is high and has a low noise in high density recording. However, because the hexagonal ferrite has a magnetization component of a vertical direction in an in-plane orientation or a random orientation, derived from a crystal structure thereof, an isolated reversion reproducing waveform becomes a unique waveform, where an isolated reversion reproducing waveform in the in-plane orientation and one in the vertical direction are added, and, for example, indicates an asymmetric waveform as shown in FIG. 2. To a specific isolated reversion reproducing waveform obtained in a case that such the hexagonal ferrite is used as the magnetic material, even if a conventional PRML signal processing optimized for a magnetic recording medium where an in-plane directional magnetization is recorded is applied, an optimum signal processing cannot be performed, and thus a specific characteristic of a hexagonal ferrite magnetic material that a reproducing output is high and has a low noise in high density recording cannot be utilized.

Consequently, it is strongly requested a reproducing method, a reproducing apparatus, and a magnetic recording medium optimized for a partial response signal processing system in reproducing an information signal from a high recording density of the magnetic recording medium.

SUMMARY OF THE INVENTION

In order to solve the problem, the present invention provides a reproducing method of equalizing and demodulating an information signal recorded in a magnetic recording medium by a partial response signal processing system and reproducing the information signal, and provides the reproducing method that equalizes and demodulates the information signal: under a condition that coefficient terms $(1, a_1, a_2, \ldots, a_m$ (m: 2n or 2n+1; n, an integer not less than 1)) of a partial response satisfy any of equations (1) and (2) below in a case that γ comprises a waveform of γ>0 and indicates an asymmetry of an isolated reversion producing waveform reproduced from the magnetic recording medium; and under a condition that the coefficient items of the partial response satisfy any of equations (3) and (4) in a case that the γ comprises a waveform of γ<0:

in a case of PR $(1, a_1, a_2, \ldots, a_{2n})$, $$1 + \left| \sum_{k=1}^{n-1} a_k \right| < \left| \sum_{k=n+1}^{2n} a_k \right|; \tag{1}$$

in a case of PR $(1, a_1, a_2, \ldots, a_{2n+1})$, $$1 + \left| \sum_{k=1}^{n} a_k \right| < \left| \sum_{k=n+1}^{2n+1} a_k \right|; \tag{2}$$

in a case of PR $(1, a_1, a_2, \ldots, a_{2n})$, $$1 + \left| \sum_{k=1}^{n-1} a_k \right| > \left| \sum_{k=n+1}^{2n} a_k \right|; \tag{3}$$

and
in a case of PR $(1, a_1, a_2, \ldots, a_{2n+1})$, $$1 + \left| \sum_{k=1}^{n} a_k \right| > \left| \sum_{k=n+1}^{2n+1} a_k \right|. \tag{4}$$

In accordance with the reproducing method it is enabled to apply an optimum PRML signal processing to a characteristic of a hexagonal ferrite magnetic material by equalizing and demodulating an information signal so that a sum of a first half and that of a second half of the coefficient terms $(1, a_1, a_2, \ldots, a_m$ (m: 2n or 2n+1; n, an integer not less than 1)) of the partial response satisfy the equations (1) and (2), or the equations (3) and (4) according to the asymmetry of the isolated reversion reproducing waveform reproduced from a magnetic recording medium.

In addition, the present invention provides a reproducing apparatus comprising: an equalizing mechanism for performing an equalizing processing for an information signal recorded in a magnetic recording medium by a partial response processing system; and a demodulation mechanism for demodulating the information signal where the equalizing processing is performed, and the invention provides the reproducing apparatus where the demodulation mechanism demodulates the information signal: under a condition that coefficient terms $(1, a_1, a_2, \ldots, a_m$ (m: 2n or 2n+1; n, an integer not less than 1)) of a partial response satisfy any of the equations (1) and (2) in a case that γ comprises a waveform of γ>0 and indicates an asymmetry of an isolated reversion producing waveform reproduced from the magnetic recording medium; and under a condition that the coefficient items of the partial response satisfy any of the equations (3) and (4) in a case that the γ comprises a waveform of γ<0.

In accordance with the reproducing apparatus it is enabled to perform an optimum partial response signal processing for a characteristic of a hexagonal ferrite magnetic material by the demodulation mechanism modulating the information signal so that a sum of a first half and that of a second half of the coefficient terms of the partial response for the information signal, where an equalizing processing is performed, by the equalizing mechanism satisfy the equations (1) and (2), or the equations (3) and (4) according to the asymmetry of the isolated reversion reproducing waveform reproduced from the magnetic recording medium.

In the present invention the γ for indicating the asymmetry of the isolated reversion producing waveform reproduced from the magnetic recording medium is an index for indicating which of the first and second halves a peak position of the isolated reversion reproducing waveform deviates to: for example, when a half value width of an isolated reversion producing waveform of a left/right asymmetry shown in FIG. 2 is assumed PW 50, out of it a right width is assumed PW1, and a left width, PW2; the γ means a ratio expressed by a following equation (5):

$$\gamma(\%) = [[(PW1) - (PW2)]/(PW50)] \times 100 \quad (5)$$

Meanwhile, the present invention provides a recording and reproducing apparatus comprising a recording mechanism for recording an information signal in a magnetic recording medium signal and a reproducing mechanism for reproducing the information signal recorded in the magnetic recording medium, and it is also enabled that the reproducing mechanism of the recording and reproducing apparatus is embodied as a configuration comprising the equalizing mechanism and the demodulation mechanism.

Furthermore, the present invention provides a magnetic recording medium used in the reproducing apparatus and the recording and reproducing apparatus.

DESCRIPTION OF THE PREFERRED EMBODIMENTS

Figure 1:
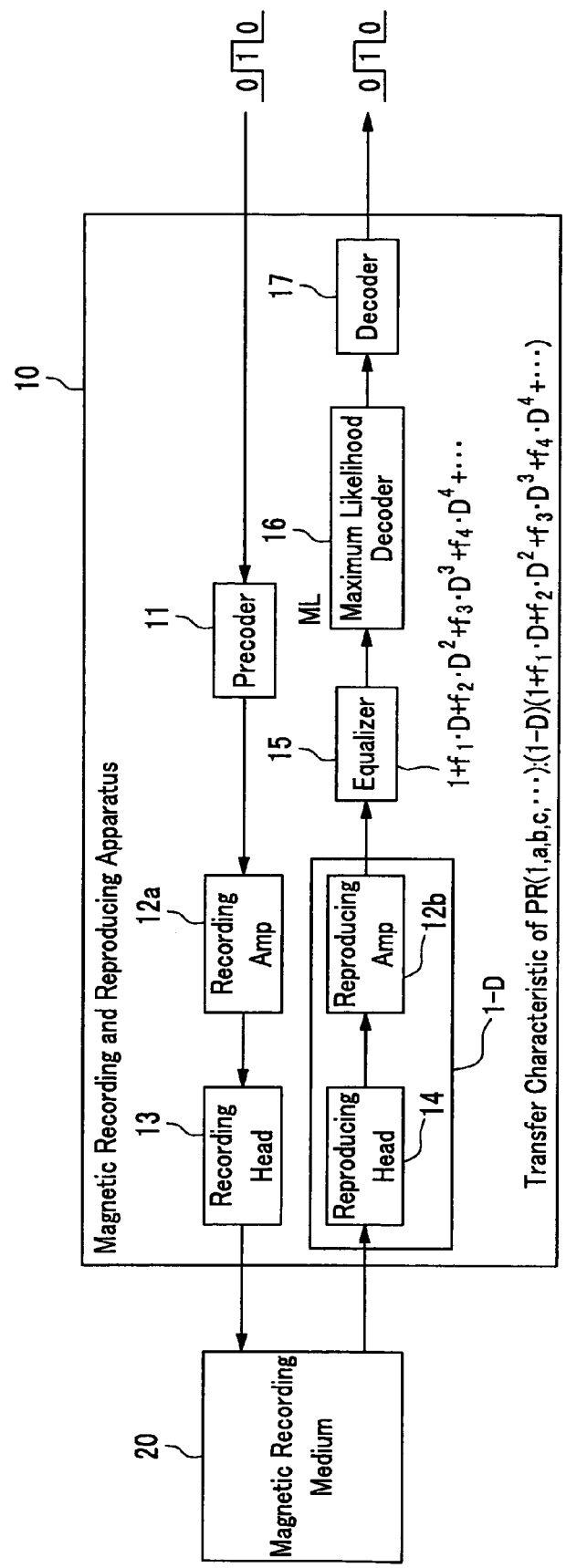
FIG. 1 is a block diagram showing a configuration example of a recording and reproducing apparatus according to an embodiment of the present invention.

Here will be described a reproducing method, a reproducing apparatus, a recording and reproducing apparatus, and a magnetic recording medium according to an embodiment of the present invention.

The magnetic recording medium of the present invention comprises a magnetic layer containing a magnetic material, where an information signal is written by a recording head of the reproducing apparatus, on one or both faces of a support body; and a non-magnetic layer under the magnetic layer.

As concrete examples of the magnetic recording medium can be cited a magnetic tape, a magnetic disk (hard disk, flexible disk), and a recording medium that can record an information signal in a magnetic layer containing a magnetic material such as a ferromagnetic alloy powder, whose main composition is Fe, in a form of a residual magnetization by a magnetic recording head.

As the support body can be used any of such a film and sheet consisting of various synthetic resins such as polyethylene terephthalate, polyethylene, polypropylene, polycarbonate, polyethylene naphthalate, polyamide, polyamide imide, polyimide, polysulfone, polyethersulfone; a metal such as aluminum and stainless steel, appropriately formed according to an application and form of the magnetic recording medium.

It is preferable that the magnetic recording medium comprises a back layer for smoothing contact with a surface of the support body at a side opposite to the magnetic layer when contacting any of a recording head and a reproducing head.

In addition, the magnetic recording medium may have layers other than the non-magnetic layer, the magnetic layer, and the back layer. For example, the magnetic recording medium may have a soft magnetic layer containing a soft magnetic powder, a second magnetic layer, a cushion layer, an overcoat layer, an adhesion layer, and a protection layer. These layers can be provided at adequate positions so as to effectively bring out their functions. A thickness of the magnetic layer is preferably 10 nm to 300 nm, more preferably 10 nm to 200 nm, and most preferably 10 nm to 100 nm. In addition, a thickness of the non magnetic layer can be made 0.5 μm to 3 μm. It is desirable that the thickness of the non magnetic layer is thicker than that of the magnetic layer.

As a magnetic material, any of a ferromagnetic metal powder and a hexagonal ferrite powder is used.

As concrete examples of the ferromagnetic metal powder, a single metal and alloy of Fe, Ni, Fe—Co, Fe—Ni, Co—Ni, Co—Ni—Fe, and the like can be cited, and within a range of not more than 20 mass % of metal compositions can be contained aluminum, silicon, sulfur, scandium, titan, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, bismuth, and the like. In addition, the ferromagnetic metal powder may also contain a small amount of water, a hydroxide, and an oxide.

An average particle size of the ferromagnetic metal powder is preferably 20 nm to 60 nm. When the ferromagnetic metal powder used is acicular and the like, an average long axis length is preferably 30 nm to 100 nm, more preferably 35 nm to 90 nm, and most preferably 40 nm to 80 nm. By making the average long axis length not more than 100 nm, a noise cab be reduced and a preferable S/N ratio of a signal can be obtained. In addition, by making the average long axis length not less than 30 nm, a preferable coercivity Hc can be ensured. An average acicular ratio of the ferromagnetic metal powder particle is preferably 3 to 10, more preferably 3 to 8, and most preferably 4 to 8. When the ferromagnetic metal powder is platy, the average particle size is represented by an average plate diameter; the diameter is preferably 25 nm to 35 nm; and an average platy ratio is preferably 2 to 5.

In the ferromagnetic metal powder, an $S_{BET}$ (specific surface area by the BET (Brunauer, Emmett and Teller) method) is usually 40 m²/g to 80 m²/g, and preferably 50 m²/g to 70 m²/g. A crystal size is usually 10 nm to 25 nm, and preferably 11 nm to 22 nm. A pH of the ferromagnetic metal powder is preferably not less than 7.

These ferromagnetic metal powders can be manufactured according to a known method. Although there is specifically no limitation for shapes of the ferromagnetic metal powders, usually an acicular shape, a grit shape, a cubic shape, a rice grain shape, a platy shape, and the like are used. It is specifically preferable to use an acicular ferromagnetic metal powder.

A coercivity Hc of the ferromagnetic metal powder is preferably 144 kA/m to 300 kA/m, and more preferably 160 kA/m to 224 kA/m. In addition, a saturation magnetization thereof is preferably 85 A·m²/kg to 150 A·m²/kg, and more preferably 100 A·m²/kg to 130 A·m²/kg.

In addition, as hexagonal ferrite can be cited barium ferrite, strontium ferrite, lead ferrite, calcium ferrite, and various substitution materials, for example, a Co substitution material, and the like. To be more precise, as the hexagonal ferrite powder can be cited a magnetoplumbite type barium ferrite and strontium ferrite, the magnetoplumbite type ferrite whose particle surface is covered with spinel, further a compound magnetoplumbite type barium ferrite and strontium ferrite that partially contain a spinel phase, and the like; and other than predetermined elements, following ones may be contained: Al, Si, S, Nb, Ti, V, Cr, Cu, Y, Mo, Rh, Pd, Ag, Sn, Sb, Te, W, Re, Au, Bi, La, Ce, Pr, Nd, P, Co, Mn, Zn, Ni, B, Ge, and the like. Generally, the hexagonal ferrite powder where following compounds are added can be used: Co—Zn, Co—Ti, Co—Ti—Zr, Co—Ti—Zn, Ni—Ti—Zn, Nb—Zn—Co, Sn—Zn—Co, Sn—Co—Ti, Nb—Zn, and the like. In addition, W-type hexagonal ferrite can also be used. Furthermore, some hexagonal ferrite powders may contain a specific impurity in accordance with materials and/or manufacturing methods. These hexagonal ferrites are used in a form of a hexagonal platy powder.

In reproducing with high density recording, especially with the MR head, a noise can be reduced and a higher S/N ratio can be obtained by making the average plate diameter and plate thickness of the hexagonal ferrite magnetic powder not more than 50 nm and not more than 15 nm, respectively, A specific surface area by the BET method is usually 30 m²/g to 200 m²/g, and preferably 50 m²/g to 100 m²/g. The specific surface area roughly checks with an arithmetic calculation value from a diameter and thickness of a powder. The narrower a distribution of a product of a plate diameter and a plate thickness, the more preferable it is. Although many distributions are not a normal distribution, they are expressed as σ/(average plate diameter or average thickness)=0.1 to 0.5 if calculated and expressed in a standard deviation for a powder size. In order to make a powder size distribution sharp, it is performed to make a powder generation-reaction system uniform as much as possible and to also dispense a distribution improvement treatment to a generation powder. For example, such a method of selectively dissolving an ultra fine powder in an acid solution is also known. In a vitrification-crystallization method a more uniform powder is obtained by performing heat treatments plural times and separating a nucleus generation and growth. Although the coercivity Hc measured in a magnetic powder can be made till around 40 kA/m to 400 kA/m, 144 kA/m to 300 kA/m is preferable. Although a higher Hc is more advantageous in high density recording, it is limited according to an ability of a recording head. An Hc can be controlled by the powder size (the product of a plate diameter and a plate thickness), kinds and amounts of contained elements, substitution sites of elements, powder generation-reaction conditions, and the like.

A saturation magnetization a $\sigma_s$ of the hexagonal ferrite magnetic powder is preferably 30 A·m²/kg to 70 A·m²/kg. The finer a powder becomes, the smaller the $\sigma_s$ tends to become.

In the present invention, a magnetic recording medium is effective because the medium comprising a coating type barium ferrite (BaFe) magnetic layer, where dispersion liquid containing a barium ferrite powder of hexagonal ferrite is coated on a support body and a magnetic layer is formed, specifically comprising the coating type barium ferrite magnetic layer using a barium ferrite material whose plate diameter is not more than 40 nm is excellent in a reproducing output in high density recording (specifically linear recording density more than 100 kfci) and has a characteristic of being low in noise.

Generally in a magnetic recording medium where any of an iron oxide and a ferromagnetic oxide containing cobalt is used as a magnetic material, an isolated reversion reproducing waveform reproduced indicates an asymmetry of $\gamma \cong 0$; in a magnetic recording medium where hexagonal ferrite is used as the magnetic material, the isolated reversion reproducing waveform reproduced indicates an asymmetry of $\gamma>0$. In addition, in a magnetic recording medium comprising a magnetic layer formed by a vapor deposition method, the isolated reversion reproducing waveform reproduced indicates an asymmetry of $\gamma<0$. Accordingly, it is enabled to perform an optimum partial response signal processing according to a magnetic material forming a magnetic layer of the magnetic recording medium by performing an equalizing processing so that a partial response signal processing satisfies a condition expressed by the equations (1) and (2), or the equations (3) and (4) according to these asymmetries.

In other words, in reproducing an information signal from a magnetic recording medium, the reproducing method and apparatus of the present invention can foresee in advance whether the γ for indicating the asymmetry of the isolated reversion reproducing waveform is $\gamma>0$, $\gamma<0$, or $\gamma \cong 0$, firstly in an analog signal read from the magnetic recording medium with a recording/reproducing head according to a magnetic material used in the magnetic recording medium. Accordingly, when the γ for indicating the asymmetry of the isolated reversion reproducing waveform comprising a waveform of $\gamma>0$ according to the magnetic material used in the magnetic recording medium, the reproducing method and apparatus of the present invention performs an equalizing processing for the information signal read from the magnetic recording medium, modulates the signal where the equalizing processing is performed, and restores an original signal thereof by a partial response signal processing system in a condition that coefficient terms $(1, a_1, a_2, \ldots, a_m$ (m: 2n or 2n+1; n, an integer not less than 1)) of the partial response satisfy any of the equation (1) and (2). In addition, when the γ for indicating the asymmetry of the isolated reversion reproducing waveform comprising a waveform of γ<0 according to the magnetic material used in the magnetic recording medium, the reproducing method and apparatus of the present invention performs the equalizing processing for the information signal read from the magnetic recording medium, modulates the signal where the equalizing processing is performed, and restores an original signal thereof by a partial response signal processing system in a condition that the coefficient terms $(1, a_1, a_2, \ldots, a_m$ (m: 2n or 2n+1; n, an integer not less than 1)) of the partial response satisfy any of the equation (3) and (4). Thus, depending on the asymmetry of the isolated reversion reproducing waveform, it is enabled to restore a reproducing signal with a low error rate by selecting an optimum partial response signal processing, that is, an equalizing processing to be performed by which one of optimum partial response signal processing systems such as the PR4ML (PR (1, 0, −1)ML), EPR4ML (PR (1, 1, −1, −1)ML), EEPR4ML (PR (1, 2, 0, −2, −1)ML), EEEPR4ML (PR (1, 3, 2, −2, −3, −1)ML).

Next will be described a reproducing method and recording and reproducing apparatus of the embodiment of the present invention, taking a magnetic recording medium comprising a magnetic layer containing barium ferrite as a magnetic material, referring to FIGS. 1 to 3.

Meanwhile, because a recording and reproducing apparatus described below includes a function of a reproducing apparatus related to the present invention, it is assumed that the reproducing apparatus is also described by a description of the recording and reproducing apparatus described below.

FIG. 1 shows a configuration example of a recording and reproducing apparatus 10 as an example of a reproducing apparatus of the embodiment, and the apparatus 10 comprises a precoder 11, a recording amp 12a, a reproducing amp 12b, a recording head 13, a reproducing head 14, an equalizer 15, a maximum likelihood decoder 16, a decoder (demodulation mechanism) 17.

The precoder 11 becomes able to prevent a propagation of an error generated in demodulation by being put before a data recording.

The recording amp 12a amplifies a signal coded by the precoder 11, and the reproducing amp 12b amplifies a signal generated by the reproducing head 14 described later.

The recording head 13 magnetizes a barium ferrite magnetic material contained in a magnetic layer of a magnetic recording medium 20, and records data of a predetermined clock period in the magnetic recording medium 20.

The reproducing head 14 contacts the magnetic layer of the magnetic recording medium 20, reads a magnetization change of the magnetic layer, and obtains an analog reproducing signal. The analog reproducing signal is a signal obtained by discriminating a signal recorded in the magnetic layer of the magnetic recording medium 20, and is expressed in a transfer characteristic of (1-D).

Figure 2:
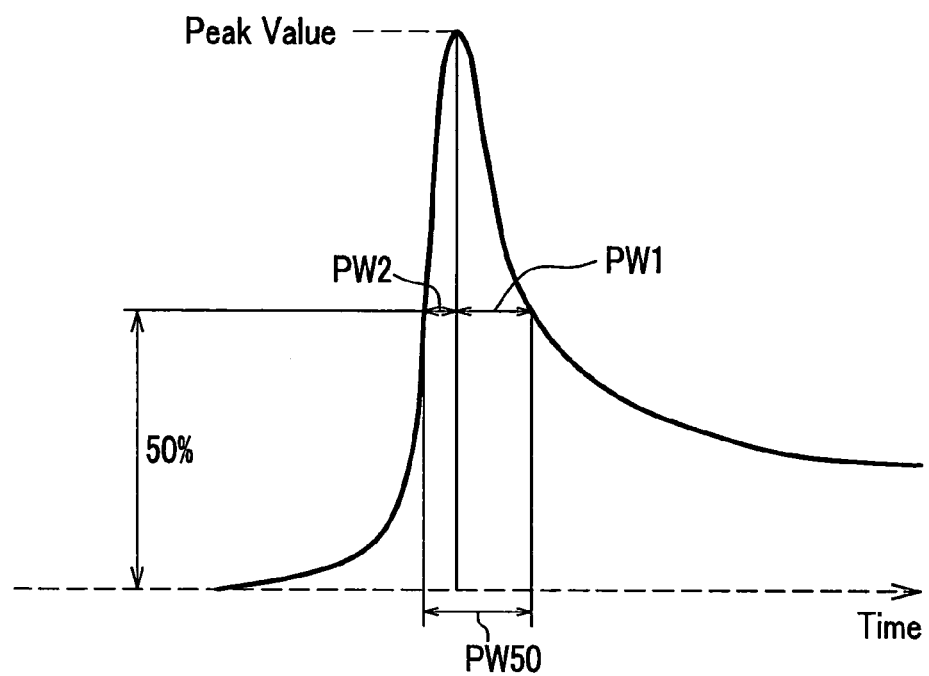
FIG. 2 is an example showing an isolated reversion reproducing waveform.
Figure 3:
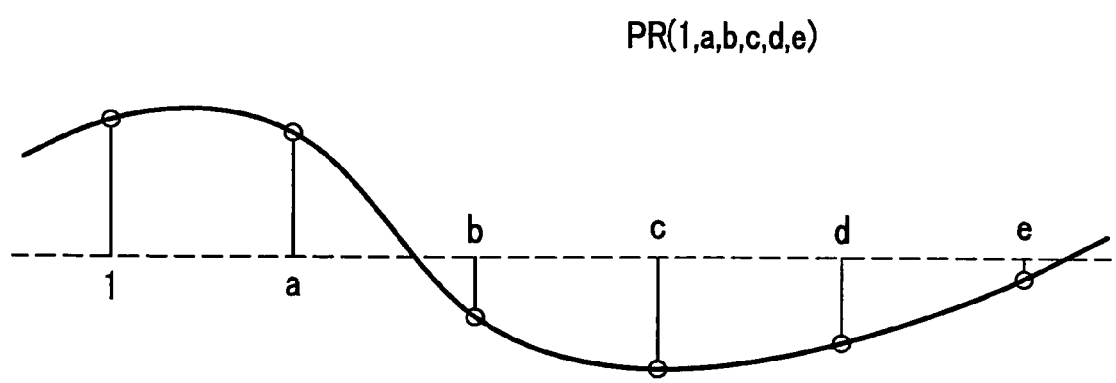
FIG. 3 is a drawing showing an example of a signal sequence in a partial response signal processing.

An example of a waveform of the analog reproducing signal generated by reading of the reproducing head 14 is shown in FIG. 2. Here, as an example, will be described an isolated reversion reproducing waveform generated at a timing of a rising edge of a pulse signal recorded in the magnetic recording medium 20.

The isolated reversion reproducing waveform shown in FIG. 2 has a peak in a positive direction, and left/right of the peak results in asymmetry. In addition, in the isolated reversion reproducing waveform, out of a half value width PW50 of a peak value, a right width PW1 results in being larger than a left width PW2. The isolated reversion reproducing waveform is something where a magnetization component of an in-plane orientation and a vertical magnetization component specific to barium ferrite are added.

Meanwhile, in FIG. 2, although the isolated reversion reproducing waveform with the peak in the positive direction is shown as the analog reproducing signal, a waveform of the analog reproducing signal is practically composed by two isolated reversion reproducing waveforms with respective peaks in the positive and negative directions overlapping. This is because the isolated reversion reproducing waveform with the peak in the negative direction is also generated at a timing of a falling edge of a pulse signal recorded in the magnetic recording medium 20.

The equalizer 15 (equalizing mechanism) equalizes a signal transferred from the reproducing head 14 through the recording/reproducing amp 12. When a transfer characteristic of PR $(1, a, b, c, d, e, \ldots)$ is $1+a*D+b*D^2+c*D^3+d*D^4+e*D^5+ \ldots =(1-D)(1+f_1*D+f_2*D^2+f_3*D^3+f_4*D^4+ \ldots)$, to be more precise, the equalizer 15 performs an equalization so that the transfer characteristic is expressed in $1+f_1*D+f_2*D^2+f_3*D^3+f_4*D^4+ \ldots$.

The maximum likelihood decoder 16 identifies data equalized by the equalizer 15. A maximum likelihood decode is a method of detecting a maximum likelihood data sequence when performing recording/reproducing with making a correlation exist between data, and is a known technology. Then, the decoder 17 decodes a signal, where an equalizing processing is performed, to an original signal (for example, (0, 1, 0)). Thus it is enabled to correctly restore recording data recorded in the magnetic recording medium 20 to original data thereof.

EXAMPLE

Here will be shown an example where the reproducing method of the embodiment of the present invention is concretely practiced.

<Prescription of Coating Liquid for BaFe Magnetic Layer>

| | |
|---|---|
| Barium ferrite magnetic powder | 100 part |
| Urethane resin | 14 part |
| Mass average molecular weight: 10000 | |
| Sulphonic acid functional group: 0.05 meq/g | |
| Abrasive | 8 part |
| Carbon black (particle size: 0.015 μm) | 0.5 part |
| #55 (manufactured by Asahi Carbon Co., Ltd) | |
| Stearic acid | 0.5 part |
| Butyl stearate | 2 part |
| Methyethlketone | 180 part |
| Cyclohexanone | 100 part |

<Prescription of Coating Liquid for Non-Magnetic Layer>

| | |
|---|---|
| Non-Magnetic powder: α iron oxide | 100 part |
| Average primary particle size: 0.9 μm | |
| Specific surface area by BET method: 50 m$^2$/g | |
| pH: 7 | |
| DBP oil absorption amount: 27 to 38 ml/100 g | |
| Surface treatment layer: Al2O3 exists by 8 mass % for total particles. | |
| Carbon black | 25 part |
| CONDUCTEX SC-U (manufactured by Colombian Carbon Corp.) | |
| Vinyl chloride copolymer: MR104 (manufactured by ZEON CORP.) | 13 part |
| Polyurethane resin: UR8200 (manufactured by TOYOBO CO., LTD) | 5 part |
| Phenyl phosphoric acid | 3.5 part |
| Butyl stearate | 1 part |

-continued

| | |
|---|---|
| Stearic acid | 2 part |
| Methyethlketone | 205 part |
| Cyclohexanone | 135 part |

<Manufacturing of Tape>

According to the prescriptions of the above coating liquid, each constituent was kneaded by a kneader. The kneaded liquid obtained was passed by a pump to a horizontal sand mill where beads of 100 mm diameter were filled with zirconia of an amount of 80% for a volume of a dispersion unit, was dispersed for 120 minutes (time of substantially staying in the dispersion unit) at 2000 rpm, and thus dispersion liquid for a magnetic layer and one for an non-magnetic layer were adjusted, respectively. Furthermore, to the dispersion liquid for the magnetic layer was added methylethylketone by three part, the dispersion liquid was filtrated with using a filter having an average particle diameter of 1 μm, and thus the coating liquid for forming the magnetic layer was obtained. In addition, to the dispersion liquid for the non-magnetic layer was added polyisocyanate by 2.5 part and moreover methylethylketone by three part, the dispersion liquid was filtrated with using a filter with an average particle diameter of 1 μm, and thus the coating liquid for forming the non-magnetic layer was obtained.

The obtained coating liquid for forming the non-magnetic layer was coated and dried on a polyethylene naphthalete of a thickness of 4 μm so that a thickness of the liquid after drying becomes 1.5 μm, and thus the non-magnetic layer was formed. After then, the coating liquid for forming the magnetic layer was sequentially coated over on the non-magnetic layer so that a thickness of the magnetic layer becomes 30 nm to 210 nm; while the magnetic layer was still in a wet state, a BaFe magnetic material within the magnetic layer by a cobalt magnet and solenoid with each magnetic force of 600 mT was in-plane oriented; furthermore a magnetic field was applied in a vertical direction by the cobalt magnet with a magnetic force of 600 mT; thus the magnetic material was obliquely oriented; and the magnetic field in the vertical direction was kept till drying of the magnetic layer was finished. Next, a treatment was performed by a 7-high calendar roll at a temperature of 90 degrees Celsius and a linear pressure of 300 kg/cm (294 kN/m). After then, coating liquid of a prescription below for forming a back layer was coated on an opposite face where the non-magnetic layer and the magnetic layer were formed, the back layer of a thickness of 0.5 μm was formed, and thus a web raw material was obtained.

<<Coating Liquid for Forming Back Layer>>

| | |
|---|---|
| Carbon black (average particle size: 17 nm) | 100 part |
| Calcium carbonate (average particle size: 40 nm) | 80 part |
| α alumina (average particle size: 200 nm) | 5 part |

Dispersion Liquid (Nitrocellulose Resin, Polyurethane Resin, Polyisocyanate)

The web raw material having the non-magnetic layer and the magnetic layer on one face and the back layer on the other face as described above was slit into a width of 3.8 mm; it was attached to an apparatus comprising a supply unit of a slit product and a take-up unit so that a non-woven cloth and a razor blade were pushed and contacted to the magnetic face; the surface of the magnetic layer was cleaned by a tape cleaning apparatus; and thus a magnetic tape having the magnetic layer containing the BaFe magnetic material was obtained.

In the magnetic tape containing the BaFe magnetic material were recorded data waveforms different in normalized linear density K=(PW50)/(bit length), using the reproducing apparatus whose configuration is shown in FIG. 1 described before, and thus three kinds of samples of magnetic tapes for reproducing were prepared. With respect to isolated reversion reproducing waveforms (γ=22%) reproduced from each of these three kinds of the magnetic tapes, error rates were measured in coefficients, where an absolute value of a sum of a first half of characteristic terms is smaller than that of a second half thereof, by a PR (1, a, b, c) ML system, PR (1, a, b, c, d) ML system, and PR (1, a, b, c, d, e) ML system. In addition, error rates were also measured in usual PRML systems (=PR (1, 1, −1, −1) ML system), PR (1, 2, 0, −2, −1)ML system, and PR (1, 3, 2, −2, −3, −1)ML system).

In addition, also with respect to a magnetic tape where a metal (ferromagnetic alloy powder of Fe being a main composition thereof, γ=3%) was used and an ME magnetic tape (magnetic layer by a vapor deposition method, γ=−13%), error rates were similarly measured. Results obtained are shown in Table 1.

TABLE 1

| | | | Coefficient a | Coefficient b | Coefficient c | Coefficient d | Coefficient e | Absolute value of sum of first half terms | | Absolute value of sum of second half terms | Error rate (figure) for integer type of PR system | | |
|---|---|---|---|---|---|---|---|---|---|---|---|---|---|
| | | | | | | | | | | | Waveform 1 BaFe γ = 22% | Waveform 2 metal γ = 3% | Waveform 3 ME γ = −13% |
| K = 3, 4 | PR(1, a, b, c) | | <u>1.0</u> | <u>0.6</u> | *−1.1* | *−0.7* | — | — | 1.6 | < | 1.8 | −0.8 | 0.0 | 0.5 |
| | | | <u>1.0</u> | <u>1.0</u> | *−1.0* | *−1.0* | — | — | 2.0 | = | 2.0 | 0.0 | 0.0 | 0.0 |
| | | | <u>1.0</u> | <u>1.0</u> | *−0.9* | *−0.8* | — | — | 2.0 | > | 1.7 | 0.5 | 0.1 | −0.4 |
| K = 3, 9 | PR(1, a, b, c, d) | | <u>1.0</u> | <u>0.5</u> | *−0.7* | *−1.0* | *−0.7* | — | 1.5 | < | 1.7 | −0.9 | 0.2 | 0.8 |
| | | | <u>1.0</u> | <u>2.0</u> | *0.0* | *−2.0* | *−1.0* | — | 3.0 | = | 3.0 | 0.0 | 0.0 | 0.0 |
| | | | <u>1.0</u> | <u>0.8</u> | *−0.7* | *−0.8* | *−0.3* | — | 1.8 | > | 1.1 | 0.7 | 0.1 | −0.6 |
| K = 4, 7 | PR(1, a, b, c, d, e) | | <u>1.0</u> | <u>1.1</u> | <u>−0.4</u> | *−1.0* | *−0.8* | *−0.2* | 1.7 | < | 2.0 | −1.1 | 0.2 | 0.8 |
| | | | <u>1.0</u> | <u>3.0</u> | <u>2.0</u> | *−2.0* | *−3.0* | *−1.0* | 6.0 | = | 6.0 | 0.0 | 0.0 | 0.0 |
| | | | <u>1.0</u> | <u>1.3</u> | <u>0.1</u> | *−0.8* | *−0.9* | *−0.3* | 2.4 | < | 2.0 | 0.9 | 0.2 | −1.0 |

First half terms: underlined
Second half terms: italic

According to the results shown in Table 1, in the magnetic tapes using barium ferrite (BaFe) of γ(=22%)>0 magnetic material and a metal (ferromagnetic alloy powder of Fe being a main composition thereof) of γ(=3%)>0, it is proved that the error rates are reduced in a case of any of the equations (1) and (2).

In addition, in the ME (magnetic layer by a vapor deposition method, it is proved that the error rates are reduced in a case of any of the equations (3) and (4).

Thus, although one of the embodiment of the present invention is described, the invention is not limited thereto and various variations are available without departing from the spirit and scope of the invention.

What is claimed is:

1. A method of equalizing and demodulating an information signal recorded in a magnetic recording medium by a partial response signal processing system, the method comprising:

equalizing and demodulating said information signal if an isolated reversion producing waveform reproduced from said magnetic recording medium indicates an asymmetry γ>0, wherein γ(%)=[[(PW1)−(PW2)]/PW50]×100;

wherein PW50 is a full width at half maximum of the isolated reversion producing waveform, PW1 is a width between a peak amplitude of the isolated reversion producing waveform and a point on a right-hand side of the peak amplitude at which the isolated reversion producing waveform has a value equal to half of the peak amplitude, PW2 is a width between the peak amplitude of the isolated reversion producing waveform and a point on a left-hand side of the peak amplitude at which the isolated reversion producing waveform has a value equal to half of the peak amplitude, and PW50 is equal to a sum of PW1 and PW2;

wherein if coefficient terms of the partial response are 1, $a_1, a_2, \ldots, a_{2n}$, $$1 + \left|\sum_{k=1}^{n-1} a_k\right| < \left|\sum_{k=n+1}^{2n} a_k\right|;$$

wherein if coefficient terms of the partial response are 1, $a_1, a_2, \ldots, a_{2n+1}$, $$1 + \left|\sum_{k=1}^{n} a_k\right| < \left|\sum_{k=n+1}^{2n+1} a_k\right|; \text{ and}$$

wherein n is an integer not less than 1.

2. A method according to claim 1, wherein said magnetic recording medium comprises a magnetic layer containing a hexagonal ferrite magnetic powder.

3. A method according to claim 2, wherein an average plate diameter of said hexagonal ferrite magnetic powder is not more than 50 nm and an average plate thickness of said hexagonal ferrite magnetic powder is not more than 15 nm.

4. A method according to claim 2, wherein a specific surface area of said hexagonal ferrite magnetic powder calculated by a Brunauer, Emmett, and Teller (BET) method is 30 to 200 m²/g.

5. A reproducing method according to claim 2, wherein a specific surface area of said hexagonal ferrite magnetic powder calculated by a Brunauer, Emmett, and Teller (BET) method is 50 to 100 m²/g.

6. A reproducing method according to claim 2, wherein said hexagonal ferrite magnetic powder comprises barium ferrite.

7. A method of equalizing and demodulating an information signal recorded in a magnetic recording medium by a partial response signal processing system, the method comprising:

equalizing and modulating said information signal if an isolated reversion producing waveform reproduced from said magnetic recording medium indicates an asymmetry γ<0, wherein γ(%)=[[(PW1)−(PW2)]/PW50]×100;

wherein PW50 is a full width at half maximum of the isolated reversion producing waveform, PW1 is a width between a peak amplitude of the isolated reversion producing waveform and a point on a right-hand side of the peak amplitude at which the isolated reversion producing waveform has a value equal to half of the peak amplitude, PW2 is a width between the peak amplitude of the isolated reversion producing waveform and a point on a left-hand side of the peak amplitude at which the isolated reversion producing waveform has a value equal to half of the peak amplitude, and PW50 is equal to a sum of PW1 and PW2;

wherein if coefficient terms of the partial response are 1, $a_1, a_2, \ldots, a_{2n}$, $$1 + \left|\sum_{k=1}^{n-1} a_k\right| > \left|\sum_{k=n+1}^{2n} a_k\right|;$$

wherein if coefficient terms of the partial response are 1, $a_1, a_2, \ldots, a_{2n+1}$, $$1 + \left|\sum_{k=1}^{n} a_k\right| > \left|\sum_{k=n+1}^{2n+1} a_k\right|; \text{ and}$$

wherein n is an integer not less than 1.

8. A reproducing apparatus comprising:

an equalizing mechanism for performing an equalizing processing for an information signal recorded in a magnetic recording medium by a partial response processing system; and a demodulation mechanism for demodulating the information signal where the equalizing processing is performed, wherein said demodulation mechanism demodulates said information signal if an isolated reversion producing waveform reproduced from said magnetic recording medium indicates an asymmetry γ>0, wherein γ(%)=[[(PW1)−(PW2)]/PW50]×100;

wherein PW50 is a full width at half maximum of the isolated reversion producing waveform, PW1 is a width between a peak amplitude of the isolated reversion producing waveform and a point on a right-hand side of the peak amplitude at which the isolated reversion producing waveform has a value equal to half of the peak amplitude, PW2 is a width between the peak amplitude of the isolated reversion producing waveform and a point on a left-hand side of the peak amplitude at which the isolated reversion producing waveform has a value equal to half of the peak amplitude, and PW50 is equal to a sum of PW1 and PW2;

wherein if coefficient terms of the partial response are 1, $a_1, a_2, \ldots, a_{2n}$, $$1 + \left|\sum_{k=1}^{n-1} a_k\right| < \left|\sum_{k=n+1}^{2n} a_k\right|;$$

wherein if coefficient terms of the partial response are 1, $a_1, a_2, \ldots, a_{2n+1}$, $$1 + \left|\sum_{k=1}^{n} a_k\right| < \left|\sum_{k=n+1}^{2n+1} a_k\right|; \text{ and}$$

wherein n is an integer not less than 1.

9. A reproducing apparatus according to claim 8, wherein said magnetic recording medium comprises a magnetic layer containing a hexagonal ferrite magnetic powder.

10. A reproducing apparatus according to claim 9, wherein an average plate diameter of said hexagonal ferrite magnetic powder is not more than 50 nm and an average plate thickness of said magnetic recording medium is not more than 15 nm.

11. A reproducing apparatus according to claim 9, wherein a specific surface area of said hexagonal ferrite magnetic powder calculated by a Brunauer, Emmett, and Teller (BET) method is 30 to 200 m²/g.

12. A reproducing apparatus according to claim 9, wherein a specific surface area of said hexagonal ferrite magnetic powder calculated by Brunauer, Emmett, and Teller (BET) method is 50 to 100 m²/g.

13. A reproducing apparatus according to claim 9, wherein said hexagonal ferrite magnetic powder comprises barium ferrite.

14. A reproducing apparatus according to claim 8, wherein said magnetic recording medium comprises a magnetic layer containing a ferromagnetic metal powder.

15. A reproducing apparatus according to claim 14, wherein an average particle diameter of said ferromagnetic metal powder is 20 to 60 nm.

16. A reproducing apparatus according to claim 14, wherein said ferromagnetic metal powder is acicular and an average long axis length thereof is 30 to 100 nm.

17. A reproducing apparatus according to claim 14, wherein a specific surface area of said ferromagnetic metal powder calculated by Brunauer, Emmett, and Teller (BET) method is 40 to 80 m²/g.

18. A reproducing apparatus comprising:
an equalizing mechanism for performing an equalizing processing for an information signal recorded in a magnetic recording medium by a partial response processing system; and
a demodulation mechanism for demodulating the information signal where the equalizing processing is performed,
wherein said demodulation mechanism demodulates said information signal if an isolated reversion producing waveform reproduced from said magnetic recording medium indicates an asymmetry γ<0,
wherein γ(%)=[[(PW1)−(PW2)]/PW50]×100;

wherein PW50 is a full width at half maximum of the isolated reversion producing waveform, PW1 is a width between a peak amplitude of the isolated reversion producing waveform and a point on a right-hand side of the peak amplitude at which the isolated reversion producing waveform has a value equal to half of the peak amplitude, PW2 is a width between the peak amplitude of the isolated reversion producing waveform and a point on a left-hand side of the peak amplitude at which the isolated reversion producing waveform has a value equal to half of the peak amplitude, and PW50 is equal to a sum of PW1 and PW2;

wherein if coefficient terms of the partial response are 1, $a_1, a_2, \ldots, a_{2n}$, $$1 + \left|\sum_{k=1}^{n-1} a_k\right| > \left|\sum_{k=n+1}^{2n} a_k\right|;$$

wherein if coefficient terms of the partial response are 1, $a_1, a_2, \ldots, a_{2n+1}$, $$1 + \left|\sum_{k=1}^{n} a_k\right| > \left|\sum_{k=n+1}^{2n+1} a_k\right|; \text{ and}$$

wherein n is an integer not less than 1.

19. A magnetic recording medium used in a reproducing apparatus according to claim 8.

20. A magnetic recording medium used in a reproducing apparatus according to claim 18.

21. A recording and reproducing apparatus comprising:
a recording mechanism for recording an information signal in a magnetic recording medium; and
a reproducing mechanism for reproducing said information signal recorded in said magnetic recording medium,
wherein said reproducing mechanism comprises an equalizing mechanism for performing an equalizing processing for said information signal recorded in said magnetic recording medium by a partial response processing system, and a demodulation mechanism for demodulating the information signal where the equalizing processing is performed,
wherein said demodulation mechanism demodulates said information signal if an isolated reversion producing waveform reproduced from said magnetic recording medium indicates an asymmetry γ>0,
wherein γ(%)=[[(PW1)−(PW2)]/PW50]×100;
wherein PW50 is a full width at half maximum of the isolated reversion producing waveform, PW1 is a width between a peak amplitude of the isolated reversion producing waveform and a point on a right-hand side of the peak amplitude at which the isolated reversion producing waveform has a value equal to half of the peak amplitude, PW2 is a width between the peak amplitude of the isolated reversion producing waveform and a point on a left-hand side of the peak amplitude at which the isolated reversion producing waveform has a value equal to half of the peak amplitude, and PW50 is equal to a sum of PW1 and PW2;
wherein if coefficient terms of the partial response are 1, $a_1, a_2, \ldots, a_{2n}$, $$1 + \left|\sum_{k=1}^{n-1} a_k\right| < \left|\sum_{k=n+1}^{2n} a_k\right|;$$

wherein if coefficient terms of the partial response are 1, $a_1, a_2, \ldots, a_{2n+1}$, $$1 + \left|\sum_{k=1}^{n} a_k\right| < \left|\sum_{k=n+1}^{2n+1} a_k\right|; \text{ and}$$

wherein n is an integer not less than 1.

22. A recording and reproducing apparatus comprising:
a recording mechanism for recording an information signal in a magnetic recording medium; and
a reproducing mechanism for reproducing said information signal recorded in said magnetic recording medium,
wherein said reproducing mechanism comprises an equalizing mechanism for performing an equalizing processing for said information signal recorded in said magnetic recording medium by a partial response processing system, and a demodulation mechanism for demodulating the information signal where the equalizing processing is performed,
wherein said demodulation mechanism demodulates said information signal if an isolated reversion producing waveform reproduced from said magnetic recording medium indicates an asymmetry $\gamma<0$, wherein $\gamma(\%)=[[(PW1)-(PW2)]/PW50]\times 100$;
wherein PW50 is a full width at half maximum of the isolated reversion producing waveform, PW1 is a width between a peak amplitude of the isolated reversion producing waveform and a point on a right-hand side of the peak amplitude at which the isolated reversion producing waveform has a value equal to half of the peak amplitude, PW2 is a width between the peak amplitude of the isolated reversion producing waveform and a point on a left-hand side of the peak amplitude at which the isolated reversion producing waveform has a value equal to half of the peak amplitude, and PW50 is equal to a sum of PW1 and PW2;
wherein if coefficient terms of the partial response are 1, $a_1, a_2, \ldots, a_{2n}$, $$1 + \left|\sum_{k=1}^{n-1} a_k\right| > \left|\sum_{k=n+1}^{2n} a_k\right|;$$

wherein if coefficient terms of the partial response are 1, $a_1, a_2, \ldots, a_{2n+1}$, $$1 + \left|\sum_{k=1}^{n} a_k\right| > \left|\sum_{k=n+1}^{2n+1} a_k\right|; \text{ and}$$

wherein n is an integer not less than 1.

* * * * *